Figure 1:
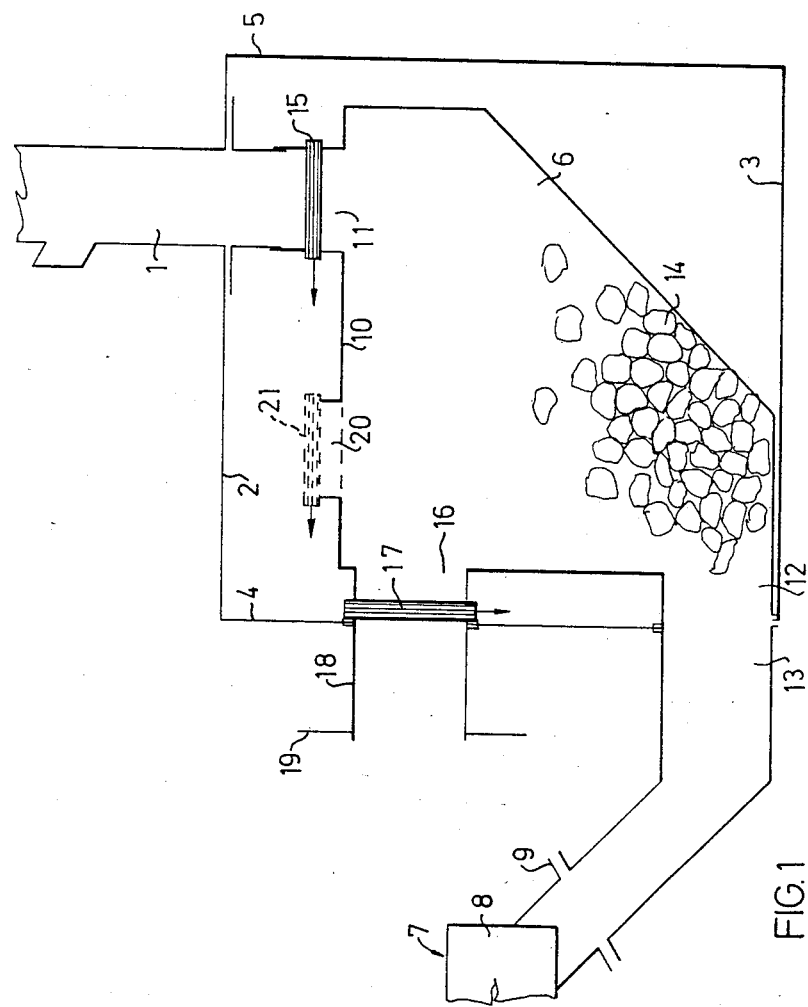

United States Patent [19]

Wassdahl

[11] Patent Number: 4,589,592
[45] Date of Patent: May 20, 1986

[54] GARBAGE CONTAINER TO BE EMPTIED WITH THE AID OF VACUUM

[76] Inventor: Lars A. Wassdahl, Spelmansvägen 12, S-79400 Orsa, Sweden

[21] Appl. No.: 601,343

[22] Filed: Apr. 17, 1984

[30] Foreign Application Priority Data

May 31, 1983 [SE] Sweden ............................ 8303067

[51] Int. Cl.$^4$ ............................................ B65G 53/24
[52] U.S. Cl. .................................. 232/43.1; 406/127; 406/145
[58] Field of Search ........................ 406/96, 127, 145; 193/33; 232/43.1, 43.3; 15/345

[56] References Cited

U.S. PATENT DOCUMENTS

| 2,319,725 | 5/1943 | Drinkwater | 232/43.1 X |
| 3,813,128 | 5/1974 | Ekström | 406/127 X |
| 3,977,729 | 8/1976 | Olson et al. | 406/127 X |

FOREIGN PATENT DOCUMENTS

| 220906 | 5/1968 | Sweden. |
| 371409 | 11/1974 | Sweden. |
| 394127 | 6/1977 | Sweden. |
| 8004333-4 | 6/1980 | Sweden. |
| 1014184 | 12/1965 | United Kingdom ............... 406/145 |

*Primary Examiner*—Robert P. Swiatek
*Attorney, Agent, or Firm*—Cushman, Darby & Cushman

[57] ABSTRACT

For emptying a garbage room in a multistory residential building, a garbage container is placed in the garbage room, which container has a transport duct between the lower portion of the container and a garbage truck collection chamber, which can be evacuated to produce suction in the duct and thus move the garbage, usually in garbage bags. According to the invention, the garbage container is provided with an externally operable valve at one inlet for garbage coming from a garbage chute and an opening for inlet of air, which opening is also provided with a sealable valve. For emptying, during a first evacuation phase, both valves are closed and during a second evacuation phase, the valve at the air intake is open. The garbage bags are thus evacuated of air during the first evacuation phase and pressed together into a significantly smaller volume by the air flowing in during the second evacuation phase, at the same time as they are removed through the transport duct.

6 Claims, 2 Drawing Figures

GARBAGE CONTAINER TO BE EMPTIED WITH THE AID OF VACUUM

The present invention relates to a garbage container.

To transport garbage containing household refuse from a garbage room in a multistory building, it is known to have a transport duct from the garbage room to the garbage truck chamber, which can be evacuated to produce suction in the transport duct and draw out the garbage.

Garbage is usually collected in garbage bags, which are then drawn down the garbage chute to the garbage room. The garbage is loosely packed in the bags, taking up a relatively large volume in relation to weight. This means that the transport duct must have a correspondingly relatively large diameter in order to allow the bulky bags and contents to pass through. The large duct diameter will use much power in order to produce the required suction.

The purpose of the invention is therefore to achieve a garbage container, which makes possible a transport duct of smaller diameter, at the same time as the required suction power is reduced.

This is achieved with a garbage container, which has the characterizing features disclosed in claim 1. Additional features and improvements in this container are disclosed in the rest of the claims.

Figure 2:
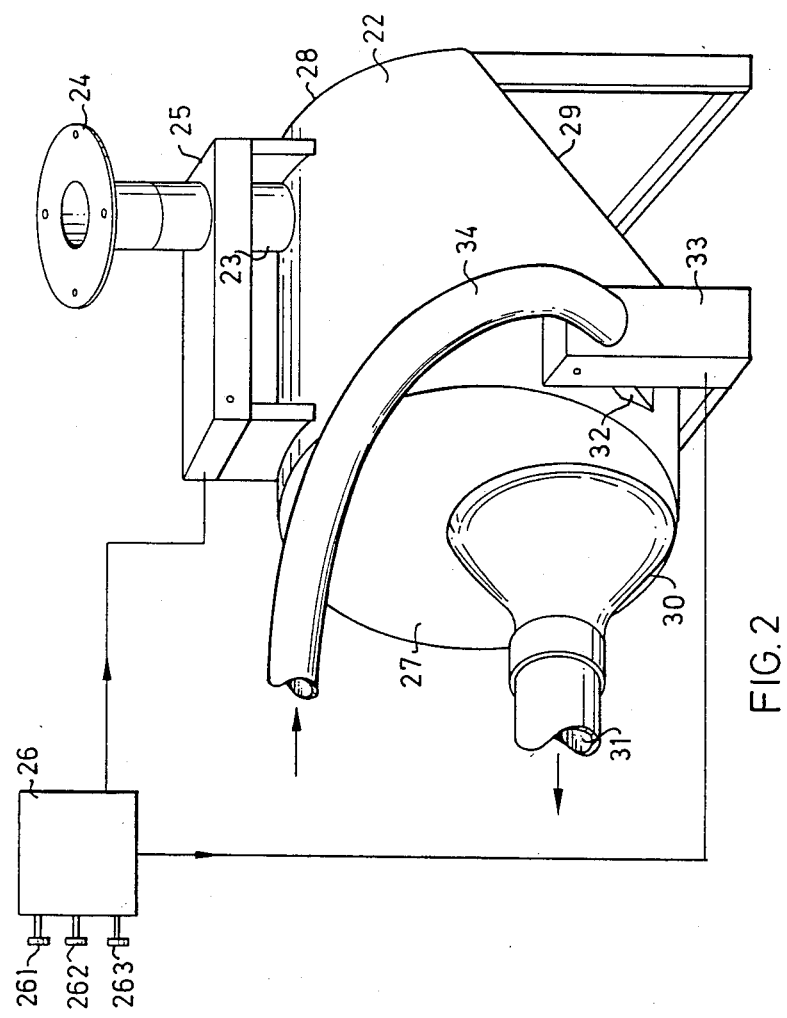

The invention will be described in more detail below with reference to the accompanying drawings, of which FIG. 1 shows a first embodiment of the garbage container according to the invention, and FIG. 2 shows a second embodiment of the garbage container according to the invention.

FIG. 1 shows schematically a unit with a garbage chute 1 to a garbage room with a ceiling 2, floor 3 and walls 4,5. A garbage container 6 is arranged in the garbage room, and can be connected to a garbage truck 7 with a collection chamber 8 via a coupling 9. In the top 10 of the garbage container 6 there is an opening 11 and the garbage container is designed to be placed in the garbage room so that the opening 11 will be directly under the opening of the garbage chute 1 in the ceiling 2. The opening 11 is connected to the garbage chute via some type of pipe connection, which is shown schematically as a tubular section, telescoping into the opening, and having an annular flange at its upper portion which can be screwed securely to the ceiling.

The garbage container 6 has at its lower end a transport duct 12, which is connected, possibly via an extra transport duct 13, to a coupling 9, to which the garbage truck can be connected. The transport duct 13 should lead to the place outside the building where it is suitable to place the coupling 9 so as to be easily accessible, even if this location should be relatively far from the garbage room. The garbage container 6 is designed so that the garbage 14 coming from the garbage chute will be collected at the transport duct 12.

The opening 11 is provided with a valve 15, which is shown in FIG. 1 in its closed, airtight position, but which is normally open, so that the garbage coming from the chute 1 will pass unimpeded through the opening 11. This valve 15 is necessary to avoid the vacuum suction spreading to the garbage chute, since a sudden suction there could result in injury to someone placing garbage in the chute just as the suction was turned on. Furthermore, garbage chutes are usually ventilated by a pipe leading to the roof of the building, thus establishing direct communication to outer atmosphere.

There is another opening 16 as well, which is also provided with a valve which is shown in the Figure in a closed, airtight position. The valve 17 can be normally open or closed. The opening 16 can lead via a duct 18 to the outside 19 of the building or to another suitable air intake. The valve 17 can be placed anywhere in the opening 16 between the garbage container 6 and the outer end of the conduit 18, and is shown in the figure placed at the inner wall 4 of the garbage room, although another suitable placement is at the outer wall of the building.

When the garbage 14, which is often contained in bags or sacks, is to be transported from the garbage container to a garbage truck 7, the garbage truck chamber 8 is connected to a duct to the coupling 9. The operator sees to it that both of the valves 15 and 17 are closed airtight.

The collection chamber in the garbage truck is then evacuated to produce a powerful vacuum, which spreads via the transport duct 12,13 to the garbage container 6. The garbage bags 14 are then also emptied of air during this evacuation, but retain their volume since the air pressure inside and outside the bags is equal.

At a set time after the beginning of the evacuation, when the garbage container is calculated to have been sufficiently emptied of air, or when a meter placed in the chamber 8 registers a suitable degree of evacuation, valve 17 at least is then opened rapidly, so that the space above the garbage is subjected to a sudden rise in pressure, the chamber 8 still being evacuated. The sudden rise in pressure results in the bags of garbage emptied of air being compressed to a greatly reduced volume. The air from the outside atmosphere flowing through the opening 16 in conjunction with the drastically reduced pressure in the duct 12,13 presses the garbage 14 through the duct 12,13 to the chamber 8.

If the garbage chute 1 has a very large volume, the valve 15 can be opened together with the valve 17, but it is advisable to only open it after the container 6 has been emptied of garbage 14 and the evacuation of the chamber 8 has been shut off. It is not necessary to connect the chamber 6 via an opening 16 to the outer wall of the building if the garbage room is large. It can then be sufficient to have an opening to the garbage room, which opening can be opened and closed with a valve. This opening 20 with the valve 21 is indicated with a dashed line. The opening 16 with the valve 17 can thus be replaced with the opening 20 with the valve 21. If the valve 15 is to be opened simultaneously with the valve 21, the two valves 15,21 can be connected to each other to form a cooperating unit (not shown). All of the valves are shown as laterally displaceable discs, but it is obvious that any other types of valves which can provide complete opening and sealing of the openings, can be used instead.

FIG. 2 shows a second embodiment of a garbage container 22 designed to be placed in a garbage room (not shown in this embodiment) and which has a tubular opening 23 in its upper portion designed to be placed beneath the garbage chute (not shown) opening through the ceiling of the garbage room, via a connector 24. The opening 23 is provided with a valve arrangement placed in a housing 25. This valve arrangement can comprise a displaceable disc of the same type as the disc 15 in FIG. 1, but can also take other forms. The essential feature of the valve arrangement 25 is that the valve must on the one hand be able to be opened at least almost completely, so that the garbage falling down the garbage chute will not be impeded by the valve, and on the other hand provide a satisfactory seal when closed, when the container 22 is evacuated. The valve arrangement can be provided with an electrically controlled closing and opening mechanism, e.g. a controlled motor which can move the valve disc in different directions. Suitable valves which can be closed and opened electrically for this purpose are wellknown in the art and are therefore not described in detail here, since the valve per se does not constitute a part of the invention. The valve in the housing 25 is electrically controlled by a control means 26 which controls the valve in response to signals initiated by the operator by means of buttons 261, 262, 263 or the like placed on the outside of the building. The diameter of the tubular opening 23 is determined by the diameter of the largest garbage chute commonly found in buildings. Adaption to various diameters of garbage chutes is done with the connector 24.

The container 22 is suitably made as a cylinder resting on its lateral surface with flat end walls 27, 28 and an inclined wall portion 29 beneath the opening 23, so that the garbage will slide down to the side of the container 22 towards the wall 27. The wall 27 has a hole in its lower end of relatively large diameter, which in the embodiment shown is approximately half of the diameter of the wall, but this size is in no way critical. An essentially funnel-shaped portion 30 has a diameter at its widest end adapted to the diameter of the hole and is fixed to the wall 27 by welding for example. The narrower end of the portion 30 is adapted to be connected to a transport duct 31, which is in turn adapted to be connected to a garbage truck in the same manner as the duct 13 in FIG. 1. Thus the garbage is not collected directly in front of the transport duct opening, thus minimizing the risk of plugging the duct during suction.

The bottom of the container 22, where the garbage is collected, is rounded, so that the portion where the garbage is collected has substantially the shape of a bathtub. The tubular inlet opening 32 for air at atmospheric pressure is in this case placed close to the bottom at the lower round portion and is preferably directed so that the air can be introduced into the container obliquely inwards, so that it has one component of motion directed tangentially along the wall of the container and another component directed towards the center of the container (not shown). The opening itself can be round but is suitably made as an elongated groove running parallel to the bottom, as is shown in FIG. 2. The area of the opening 32 is somewhat less than the cross-sectional area of the transport duct 31. Tests have shown that the ratio between the inlet area and the outlet area should be less than about 0.6. A valve arrangement is placed in a housing 33 at the tubular opening 32 into the container 22. This valve arrangement in the housing 33 can be of any type whatsoever which provides a vacuum seal when closed and can for example be of the same type as the valve arrangement in the housing 25 and controlled in the same manner. The valve arrangement can also be designed so that the area of the inlet opening can be adjusted to a size which provides the best results in each case. This can, for example, be achieved in a manner known per se with some type of adjustable throttle arrangement of diaphragm type or with a disc which can be inserted laterally into the tube 32, and which in the case shown in FIG. 2 is preferably inserted from the bottom, so that the vertical width of the tube 32 is changed. An inlet hose 34 is connected to the end of the tube 32 in the housing 33 and has its opening suitably placed for intake of air from the outside or is placed so that the risk is minimized for personal injury or other damage due to suction from the opening when the valve in the housing 33 is opened.

The device in FIG. 2 functions in the following way. When the garbage collected at portion 30 of the container 22 is to be sucked out, the operator presses the button 261 on the outside to close the valves in the housings 25 and 33, so that the container is sealed from the outer atmosphere. The vacuum chamber of the garbage truck is coupled to the transport duct 31 and the collecting chamber of the garbage truck is evacuated to produce a powerful vacuum, which spreads via the transport duct 31 to the garbage container 22. After a suitable time from the beginning of the evacuation, the operator presses button 262 to open the valve in the housing 33. Due to the low placement and orientation of the inlet tube 32, the incoming air will lift the garbage along the cylindrical wall of the container, whereby the garbage bags which were emptied of air during the evacuation, will be both compressed by the inflowing air and spun up by the powerful airflow in front of the opening to the duct 31 and be sucked into it as a result of the continued evacuation of the garbage truck evacuation chamber. The upwardly inclined portion of part 30 prevents the garbage bags from jamming in front of the opening to the transport duct, as might occur in the container shown in FIG. 1, if it should be very filled with garbage. By tumbling the garbage in front of the transport duct opening further prevention of jamming in the tube 33 is obtained and the garbage bags are transported one by one to the garbage truck through the duct 31. After completed evacuation of the garbage, the operator shuts off the evacuation of the garbage truck evacuation chamber and presses the button 263 to open the valve 25. Valve 33 can possibly be closed at the same time if it is desired to have this valve normally closed.

Many modifications are possible within the scope of the invention. In the two embodiments shown, the garbage container is in the form of a separate unit placed in a garbage room. This is due to the fact that the walls in a normal garbage room would collapse under the effect of the vacuum generated in the container. It is, however, also within the scope of the invention to provide the garbage room instead with heavily reinforced walls and with the design described in connection with the figures. The garbage container 22 in FIG. 2 need not have a rounded shape in its upper portion, even if the tumbling of the garbage is facilitated thereby. Rather, the upper portion can have vertical walls and a horizontal top portion. The essential feature is that the container 22 has a rounded bottom. The wall 29 can, of course, also be rounded with advantage, but such a form is much more difficult to achieve in practice than a flat shape. The control of the control means 26 can be effected by other means than the buttons shown, the work steps described being the essential feature.

What is claimed is:

1. Garbage container for placement in a garbage room in a building, the container being of the type to be emptied by evacuation, the container having a garbage inlet opening to receive garbage from a chute in the room, a garbage discharge opening connected to a transport duct which is connectable to a garbage truck collection chamber, the collection chamber being capable of being evacuated to produce a suction in the transport duct and to evacuate the container when the latter is connected to the collection chamber, the garbage inlet opening having a sealable valve, the garbage discharge opening being positioned at the bottom of the container laterally spaced from the garbage inlet opening, the container having an ambient air opening in communication with the atmosphere and fitted with a sealable valve, the ambient air opening being positioned close to the bottom of the container means for closing each of said valves during evacuation of the container and collection chamber and for subsequently opening the ambient air valve so that garbage is drawn from the container to the collection chamber.

2. Garbage container according to claim 1, characterized in that the second opening is placed at the bottom of the container, and that the third opening has a placement spaced from the collecting portion for garbage, whereby upon opening of the second valve the pressure on the garbage will be substantially lower at the transport duct than on the side of the garbage facing away from the transport duct.

3. Garbage container according to claim 1, characterized in that the third opening is placed in the vicinity of the bottom of the container at a collecting portion for garbage.

4. Garbage container according to claim 1, characterized in that the bottom of the garbage container at the place for garbage collection is rounded transversely to the direction of movement of the garbage.

5. A garbage container for placement in a garbage room in a building, the container being of the type to be emptied by evacuation, the container having a garbage inlet opening with a sealable valve connected to a garbage chute, a garbage discharge opening connected to a transport duct which is connectable to a garbage truck collection chamber, the collection chamber being capable of being evacuated to produce a suction in the transport duct and to evacuate the conainer when the latter is connected to the collection chamber, the container having a bottom portion disposed below the garbage inlet opening and being inclined downwardly toward the garbage discharge opening, and means for closing said valve during evacuation of the container and for subsequently opening an ambient air valve so that garbage is drawn from the container through the transport duct.

6. A garbage container for placement in a garbage room in a building, the container being of the type to be emptied by evacuation, the container having a garbage inlet opening having a valve through which garbage is received, a garbage discharge opening connected to a transport duct which is connectable to a garbage truck collection chamber, the collection chamber being capable of being evacuated to thereby produce suction in the transport duct and evacuate the container when the latter is connected to the collection chamber, an ambient air opening in the container with a valve opening to the atmosphere, the ambient air opening comprising an elongated slot extending parallel to the bottom of the container and to the direction of movement of garbage when drawn from the container, and means for closing said valves during evacuation of the container and for subsequently opening the ambient air valve so that garbage is drawn from the container through the transport duct.

* * * * *